United States Patent [19]

Lu

[11] Patent Number: 5,228,710
[45] Date of Patent: Jul. 20, 1993

[54] GEAR TRANSMISSION MECHANISM FOR A BICYCLE

[76] Inventor: Teng-Hui Lu, No. 29, Nei Keng, Nei Keng Tsun, Ta Liao Hsiang, Feng Shan Chen, Kaohsiung Hsien, Taiwan

[21] Appl. No.: 751,764

[22] Filed: Aug. 29, 1991

[51] Int. Cl.$^5$ ............................................. B62M 1/02
[52] U.S. Cl. .................................. 280/260; 280/259; 280/283; 74/414
[58] Field of Search ............... 280/283, 259, 260, 262, 280/275, 226.1; 74/414, 421 R, 640

[56] References Cited

U.S. PATENT DOCUMENTS

| | | | |
|---|---|---|---|
| 594,773 | 11/1897 | Bartel | 280/260 |
| 613,244 | 11/1898 | Chrisman | 280/260 |
| 653,862 | 7/1900 | Clark | 280/260 |
| 1,798,383 | 3/1931 | Roberds | 280/260 |
| 3,466,086 | 9/1969 | James et al. | 280/283 |

FOREIGN PATENT DOCUMENTS 0007796 2/1899 Norway .............................. 280/283

Primary Examiner—Margaret A. Focarino
Assistant Examiner—Ann Marie Boehler
Attorney, Agent, or Firm—Bacon & Thomas

[57] ABSTRACT

A gear transmission mechanism for driving a bicycle to run, comprising a base supporting frame attached to the down tube, the seat tube and the seat stay; a first axle inserted through the rear wheel hub of a bicycle into one hole on said base supporting frame with the two opposite ends thereof respectively coupled with two cranks; a first gear mounted on said first axle and carried by it to rotate; a second axle fastened in another hole on said base supporting frame to carry a second gear, which is engaged with said first gear, and a third gear, which is engaged with a one-way gear on said rear wheel hub, to rotate. Rotating the cranks causes the wheel hub to carry the bicycle wheels to rotate.

1 Claim, 3 Drawing Sheets

GEAR TRANSMISSION MECHANISM FOR A BICYCLE

BACKGROUND OF THE INVENTION

The present invention relates to a transmission mechanism for a bicycle and relates more particularly to a gear transmission mechanism for driving a bicycle to move.

Conventionally, a bicycle is generally consisted of a tubular metal frame mounted on two large wire-spoked wheels, one behind the other, and equipped with handle bars and a saddlelike seat which is propelled by foot pedals through the operation of a chain transmission mechanism. This conventional chain-transmission operated structure of bicycle is not satisfactory in use because of the following disadvantages:

1. Because the chain is constantly exposed to the air it may gather rust easily causing sticking problem;
2. The chain may disconnect from the chain wheel or the rear sprocket wheel easily causing transmission failure; and
3. It is difficult to lubricate the parts of the chain transmission mechanism or to detach them for repair if a chain guard is used.

SUMMARY OF THE INVENTION

The present invention has been accomplished to eliminate the aforesaid disadvantages. It is therefore an object of the present invention to provide a gear transmission mechanism for a bicycle which can fully transmit the power from a bicycle's pedals to the wheels thereof for driving the bicycle to move efficiently. It is another object of the present invention to provide a gear transmission mechanism for a bicycle which is durable in use and the parts of which will not be disconnected from one another easily. It is still another object of the present invention to provide a gear transmission mechanism for a bicycle which is easy to assemble can be conveniently detached for maintenance or repair.

DETAILED DESCRIPTION OF THE PREFERRED EMBODIMENT

Figure 1:
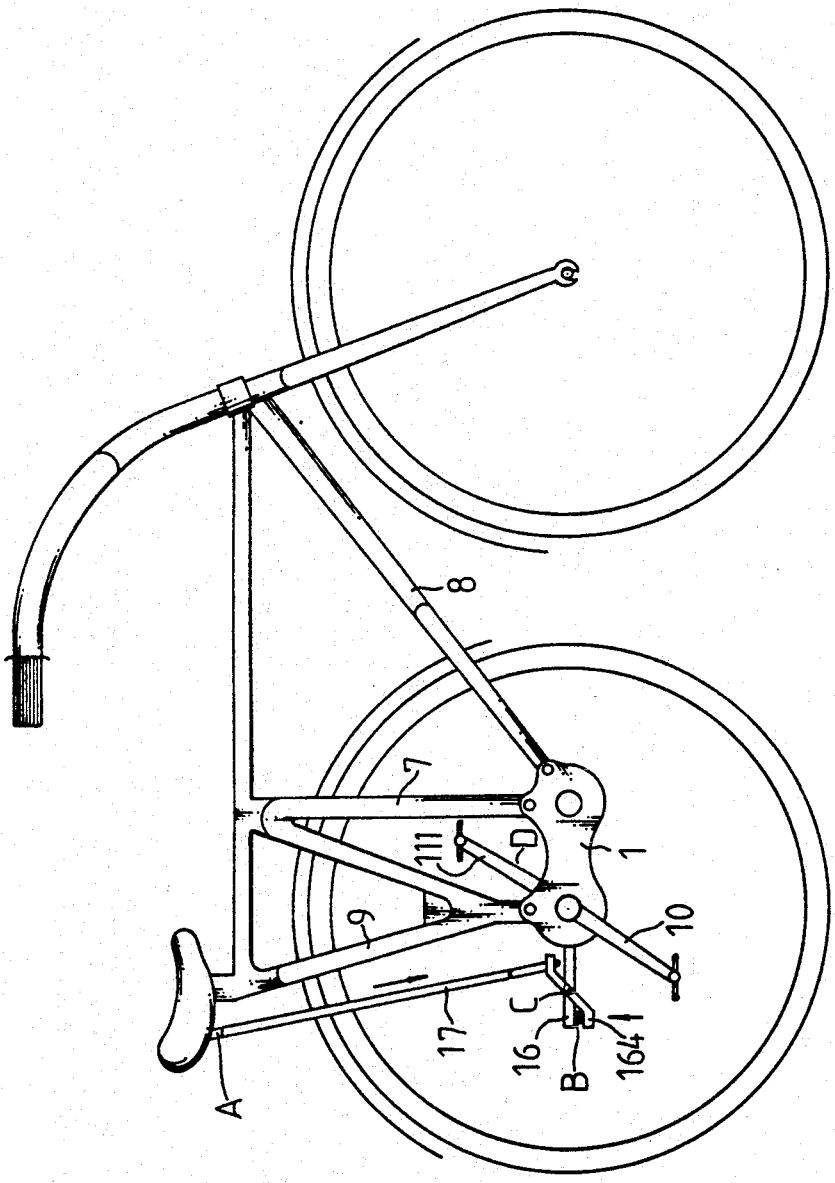
FIG. 1 is a plan view of a gear-driven bicycle as constructed according to the present invention.
Figure 2:
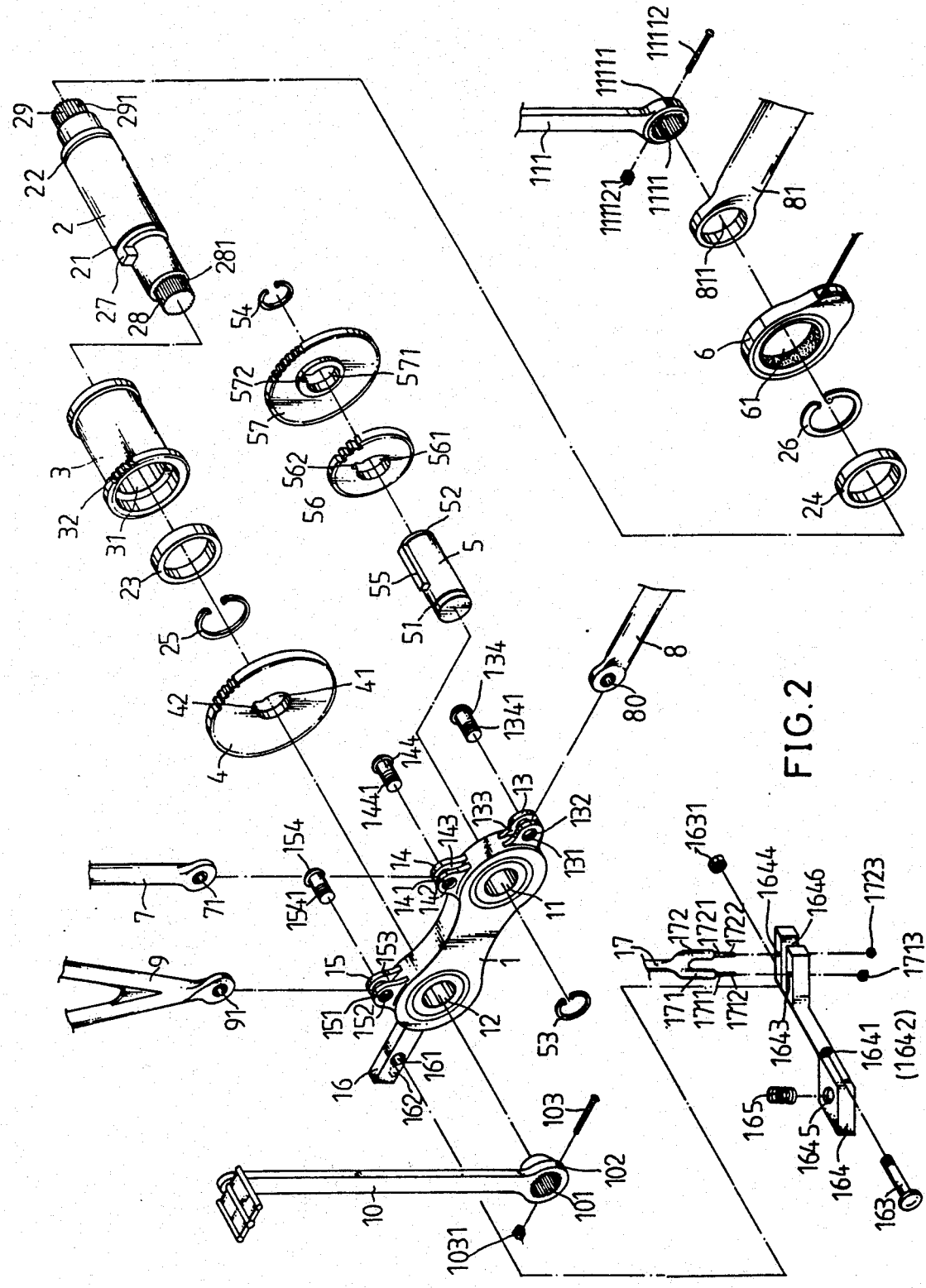
FIG. 2 is an exploded perspective view of the preferred embodiment of the gear transmission mechanism of the present invention.

Referring to FIG. 2, a gear transmission mechanism for a bicycle as constructed in accordance with the present invention is generally comprised of a base supporting frame 1, two axles 2, 5, a bicycle rear wheel hub 3, a plurality of gears 4, 56, 57, a brake head 6, a vertical tube 7, a down tube 8, a seat tube 9, and two cranks 10, 111.

The base supporting frame 1 has two spaced round holes 11, 12 for fastening the axles 2, 5, a first pair of lugs 13 at one end, a second pair of lugs 14 and a third pair of lugs 15 on the top at two opposite locations, and an extension rod 16 at an opposite end. Each pair of lugs 13, 14 or 15 have inner threads 132, 142 or 152 on the round holes 131, 141 or 151 and a gap 133, 143 or 153 therebetween. By inserting the down tube 8, the vertical tube 7 and the seat tube 9 in the gaps 133, 143, 153 of the first, second and third pairs of lugs 13, 14, 15 respectively, the base supporting frame 1 is secured to the down tube 8, the vertical tube 7 and the seat tube 9 of the frame of a bicycle by screw bolts 134, 144, 154 which have outer threads 1341, 1441, 1541 respectively screwed into the round holes 80, 71, 91 on the terminal ends of the down tube 8, vertical tube 7 and seat tube 9 and engaged with the inner threads 132, 142, 152 respectively. The extension rod 16 of the base supporting frame 1 has a round hole 161 inserted in a notch 1646 on a connecting plate 164 and secured thereto by a screw 163 which is screwed through holes 1641, 1642 on the connecting plate 164 and the round holes 161 on the extension rod 16 and locked up with a lock nut 1631. The extension rod 16 further comprises a recessed hole 162 on the bottom edge adjacent to the end edge thereof for holding a spring 165 which has an opposite end inserted in a recessed hole 1645 on the connecting plate 164. The seat stay 17 of the bicycle frame has a forked terminal 171, 172 which is formed of two connecting rods 1711, 1721 each of which having an outer thread 1712 or 1722. The two connecting rods 1711, 1721 of the forked terminal 171, 172 of the seat stay 17 are inserted through two holes 1643, 1644 on the connecting plate 164 with the outer threads 1721, 1722 respectively locked up with two lock nuts 1713, 1723. Therefore, the connecting plate 164 is connected between the seat stay 17 and the extension rod 16 of the base supporting frame 1 with a spring 165 retained between the extension rod 16 and the connecting plate 164.

The axle 2 has two toothed portions 28, 29 at two opposite ends, two pivot holes 281, 291 on said two toothed portions 28, 29, two spaced annular grooves 21, 22 at two opposite locations within said two toothed portions 28, 29, and a key 27 at a suitable location. The axle is inserted through the round hole 12 on the base supporting frame 1 adjacent to the extension rod 16 with the two toothed portions 28, 29 respectively engaged into the toothed holes 101, 1111 on the cranks 10, 111 and secured together by screws 103, 11112 which are respectively inserted through holes 102, 11111 on the cranks 10, 111, and the holes 281, 291 on the axle 2 and then locked up with lock nuts 1031, 111121 respectively. Before fastening in the round hole 12 on the base supporting frame 1, the axle 2 is inserted through the boring bore 31 of the bicycle rear wheel hub 3 which has a one-way gear 32 at one end. As soon as the bicycle rear wheel hub 3 is sleeved on the axle 2, two bearings 23, 24 are respectively mounted on the axle 2 at two opposite ends and retained in place by two clamps 25, 26 which are respectively mounted on the two spaced annular grooves 21, 22 on the axle 2. The gear 4 has a key way 42 on the center hole 41 thereof into which the key 27 on the axle 2 is engaged. Once the bicycle rear wheel hub 3, the bearings 23, 24, the clamps 25, 26, and the gear 4 are respectively mounted on the axle 2, the axle 2 is inserted through the round hole 12 on the base supporting frame 1 with one end fastened in the crank 10 and the opposite end inserted through a hole 61 on the brake head 6 and a hole 811 on a bottom bracket 81 of the bicycle frame 81 and then coupled with the other crank 111.

The axle 5 is fastened in the other round hole 11 on the base supporting frame 1, having a key 55 raised from the outer wall surface thereof and two annular grooves 51, 52 at two opposite ends. After having been inserted through the round hole 11 on the base supporting frame 1, a clamp 53 is fastened on the annular groove 51 to secure the axle 5 to the base supporting frame 1, a small gear 56 and a big gear 57 are respectively mounted on the axle 5 and secured in place by a clamp 54 which is fastened on the annular groove 52. The small and big gears 56, 57 have key ways 562, 572 on the center holes 561, 571 thereof into which the key 55 is engaged. The number of teeth on the big gear 57 is equal to the number of teeth on the gear 4 while the number of teeth on the small gear 56 is equal to the number of teeth on the one-way gear 32 of the bicycle rear wheel hub 3. After assembly, the small gear 56 is engaged with the gear 4 while the big gear 57 is engaged with the one-way gear 32 of the bicycle rear wheel hub 3.

Figure 4:
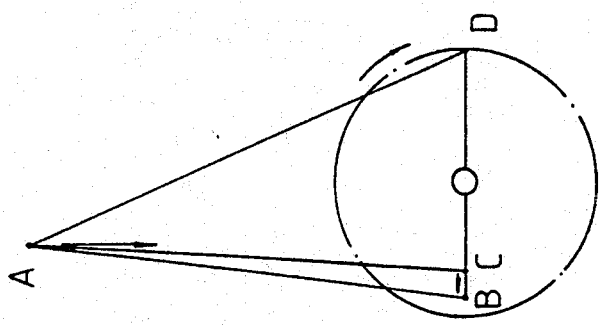
FIG. 4 is a schematic drawing illustrating the operation of the present invention when it bears the pressure.
Figure 3:
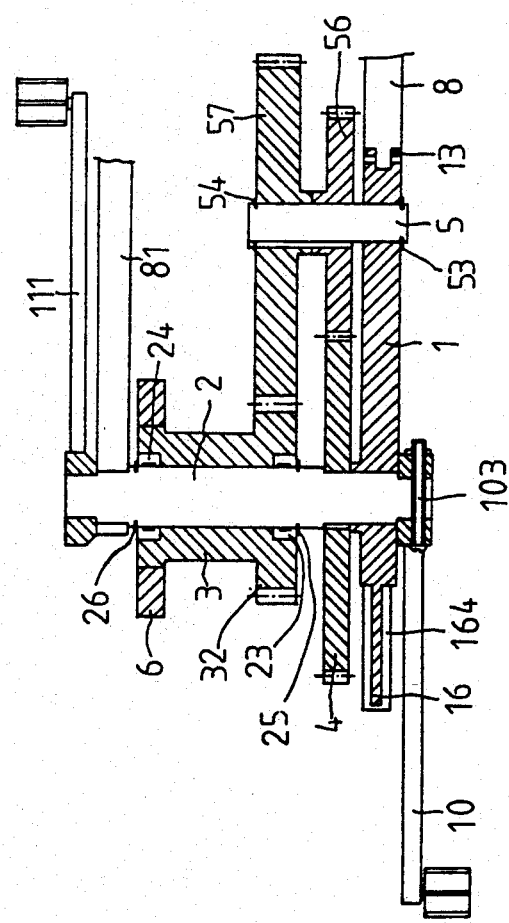
FIG. 3 is a sectional assembly view of the preferred embodiment of the gear transmission mechanism of the present invention.

Referring to FIGS. 3 and 4, when the rider sits on the bicycle saddle (at point A) the force on seat stay 17 is transferred to the spring 165 and the extension rod 16 by pivoting connecting plate 164 retained between the seat stay 17 and the extension rod 16 (at point B). Therefore, the spring 165 acts as a cushion for movement of the seat. When the two cranks 10, 111 are rotated, the axle 2 is simultaneously rotated too. Rotating the axle 2 causes the gear 4 to be rotated by the key 27. Because the small gear 56 is engaged with the gear 4, rotating the gear 4 causes the axle 5 to rotate. During the rotation of the axle 5, the big gear 57 is carried to rotate the bicycle rear wheel hub 3 through the one-way gear 32, and therefore, the bicycle is rotated to move. Because of the effectiveness of the one-way gear 32, the bicycle rear wheel hub 3 is disengaged from the big gear 57 when the big gear 57 is rotated in a reverse direction.

I claim:

1. For a bicycle having a bicycle frame comprised of a top tube, a down tube, a seat tube, a vertical tube, a seat stay and a bottom bracket, a gear transmission mechanism comprising:

a base supporting frame connected to the down tube, the vertical tube and the seat tube and having an extension rod with a terminal end coupled with a spring means, said base supporting frame defining two spaced axle holes, said two spaced axle holes including a first axle hole adjacent to the seat tube and second axle hole adjacent to the down tube;

a connecting plate coupled to and crossing over said extension rod, said connecting plate having one end connected to the seat stay and an opposite end movably connected to the spring means on the terminal end of said extension rod;

a first axle fastened in said first axle hole on said base supporting frame, said first axle having opposite ends disposed on opposite sides of said base supporting frame and being coupled with two cranks; and a key formed on a peripheral surface of the first axle, said two cranks each having a pedal coupled thereto;

a rear wheel hub mounted on said first axle and disposed at a side of said base supporting frame between said two cranks to support and carry the rear wheel of the bicycle, said rear wheel hub having a one-way gear thereon;

a first gear mounted on said first axle, disposed between said rear wheel hub and said base supporting frame and locked by the key on said first axle;

a second axle fastened in said second round hole on said base supporting frame, said second axle having an elongated key formed on a peripheral surface thereof;

a second gear mounted on said second axle locked by the key thereon and engaged with said first gear on said first axle;

a third gear mounted on said second axle locked by the key thereon and engaged with said one-way gear on said rear wheel hub; and wherein rotating said cranks causes the rear wheel hub to be rotated by said first axle via said first, second and third gears and said second axle.

* * * * *